United States Patent Office 2,791,587
Patented May 7, 1957

---

2,791,587

VAT DYESTUFFS AND PROCESS FOR THEIR MANUFACTURE

Armin Caliezi, Basel, and Walter Kern, Sissach, Switzerland, assignors to Ciba Limited, Basel, Switzerland, a Swiss firm No Drawing. Application August 22, 1955,
Serial No. 529,939

Claims priority, application Switzerland
September 13, 1954

8 Claims. (Cl. 260—272)

This invention provides a process for the manufacture of valuable vat dyestuffs wherein a product obtained by the reaction of 6:Bz-1-di-(anthraquinonyl-amino)-benzanthrone free from acylamino groups with an alkaline condensing agent is treated with a melt comprising an anhydrous aluminum chloride and sulfur dioxide or a salt of sulfurous acid.

The starting materials for the present process are in general known products, which are obtained by treating a 6:Bz-1-di-(anthraquinonyl-amino)-benzanthrone, advantageously a 6:Bz-1-di-($\alpha$-anthraquinonyl-amino)-benzanthrone with an alkaline agent. As alkaline condensing agents there come into consideration more especially alkaline metal hydroxides, and the reaction is advantageously carried out in the presence of a lower liphatic alcohol, for example, ethyl alcohol, at a 100–200° C. It is generally assumed that in this reaction there is formed a 6-membered ring which contains as a hetero atom the nitrogen atom in the Bz-1-position.

The aluminum chloride melt is composed essentially of anhydrous aluminum chloride and sulfur dioxide. The mixture may also contain a substance known to lower the melting point, such as sodium chloride, calcium chloride, sodium fluoride or mixtures of these substances. Especially valuable products are obtained by adding alkyl halides, for example, methyl chloride, to the aluminum chloride melt. The melt is advantageously prepared by heating a mixture of anhydrous aluminum chloride and the substance lowering the melting point at a relatively high temperature while simultaneously introducing sulfur dioxide until a uniform mixture is obtained, and then the mixture is cooled to the desired reaction temperature before the addition of the product which is to be reacted. The sulfur dioxide may be replaced by a salt of sulfurous acid or by selenium dioxide or a salt of selenious acid.

The relative proportions of the benzanthrone derivative and the aluminum chloride may vary within wide limits. Advantageously, however, at least 2 parts of aluminum chloride are used for each part of benzanthrone derivative. As a rule, increasing quantities of aluminum chloride shorten the reaction period.

The reaction may be carried out at a temperature within the range of about 50–140° C. In general it is advisable not to exceed 120° C. Temperatures within the range of 90–110° C. generally give especially good results.

The products so obtained are valuable vat dyestuffs whose constitution is not known and which can be used in the usual manner for dyeing or printing a very wide variety of materials, especially for dyeing or printing fibers of natural or regenerated cellulose. The olive-brown dyeings produced with the new dyestuffs are distinguished by their very good properties of fastness, especially their fastness to chlorine, bucking and light. Of special value is the fact that interesting khaki tints can be produced.

The following examples illustrate the invention, the parts and percentages being by weight.

*Example 1*

A mixture of 80 parts of aluminum chloride and 13 parts of sodium chloride is heated to 140° C. in the course of 30 minutes, and at the same time a current of sulfur dioxide is passed through the mixture. The temperature is then allowed to fall to 105° C., and 5 parts of the dyestuff obtained as described in Example 1 of German Patent No. 517,442 to Hugo Wolff et al., dated April 30, 1929 by the alkaline condensation of 6:Bz-1-di-($\alpha$-anthraquinonyl-amino)-benzanthrone are introduced. The mixture is then stirred for 1 hour at 105–110° C. in an atmosphere of sulfur dioxide. The reaction product is poured into ice and water, then rendered acid to Congo with hydrochloric acid, heated to 90° C. and filtered. There is obtained a black-brown powder, which dyes cotton strong olive-brown tints having very good properties of fastness.

*Example 2*

A mixture of 80 parts of aluminum chloride and 13 parts of sodium chloride is heated to 140° C. while passing a current of sulfur dioxide through the mixture. As soon as the melt has become clear, it is allowed to cool to 105° C., and 5 parts of the starting material used in Example 1 are added. 5 Parts of methyl chloride are then passed through the melt in the course of 15 minutes. The temperature is maintained at 105–110° C. for 1 hour, while continuously passing sulfur dioxide over the melt. The product is worked up in the manner described in Example 1. There is obtained a black-brown powder which dyes cotton strong olive-brown tints having excellent properties of fastness.

Similar products are obtained by using, instead of methyl chloride, isopropyl bromide or n-butyl chloride or amyl chloride.

*Example 3*

A mixture of 80 parts of aluminum chloride and 16 parts of sodium chloride is heated to 120° C. while passing a current of sulfur dioxide through the mixture until a clear melt is obtained. The whole is then cooled to 105° C., and 20 parts of the starting material used in Example 1 are added. The melt is then maintained at a temperature of 105–110° C. for 3 hours, and a gentle current of sulfur dioxide is continuously passed over the melt. By working up the product there is obtained a dyestuff which is very similar to that described in Example 1.

*Example 4*

1.5 parts of the dyestuff obtained as described in Example 1 are vatted with 6 parts by volume of caustic soda solution of 36° Bé. and 3 parts of sodium hydrosulfite in 100 parts of water at 40–50° C. The resulting stock vat is added to a dye bath which contains in 2,000 parts of water 6 parts by volume of caustic soda solution of 36° Bé. and 3 parts of sodium hydrosulfite, and 100 parts of cotton are entered at 40° C. After 15 minutes 20 parts of sodium chloride are added and dyeing is continued at 40–50° C. for 1 hour. The cotton is then squeezed, oxidized and finished in the usual manner. It is dyed a fast olive-brown tint.

The above dyestuff can be used very successfully for dyeing in known manner from a strongly alkaline vat at about 60° C. without the addition of sodium chloride.

What is claimed is:

1. A process for the manufacture of a vat dyestuff, which comprises treating the product corresponding to the formula

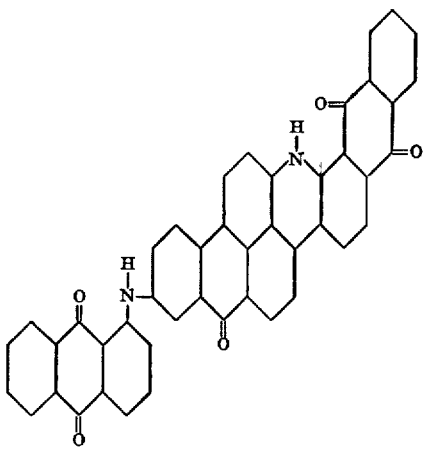

with a melt comprising anhydrous aluminum chloride, and a member selected from the group consisting of sulfur dioxide and a salt of sulfurous acid.

2. A process for the manufacture of a vat dyestuff, which comprises treating the product corresponding to the formula

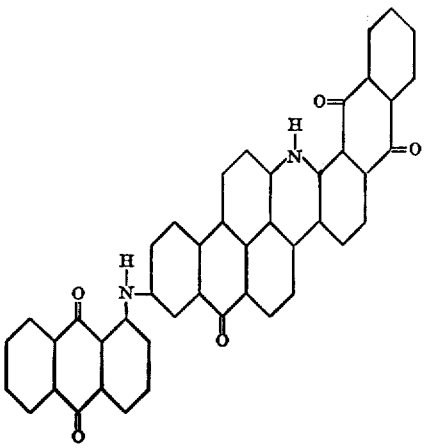

with a melt comprising (A) anhydrous aluminum chloride, (B) a member selected from the group consisting of sulfur dioxide and a salt of sulfurous acid, and (C) an inorganic substance which is inert to the reaction and which lowers the melting point.

3. A process for the manufacture of a vat dyestuff, which comprises treating, at a temperature below 120° C., the product corresponding to the formula

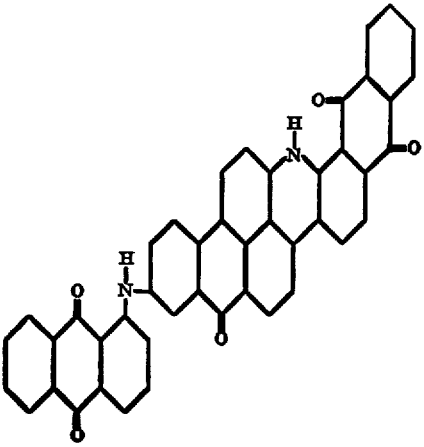

with a melt comprising (A) anhydrous aluminum chloride, (B) a member selected from the group consisting of sulfur dioxide and a salt of sulfurous acid, and (C) an inorganic substance which is inert to the reaction and which lowers the melting point.

4. A process for the manufacture of a vat dyestuff, which comprises treating, at a temperature between 50° and 120° C., the product corresponding to the formula

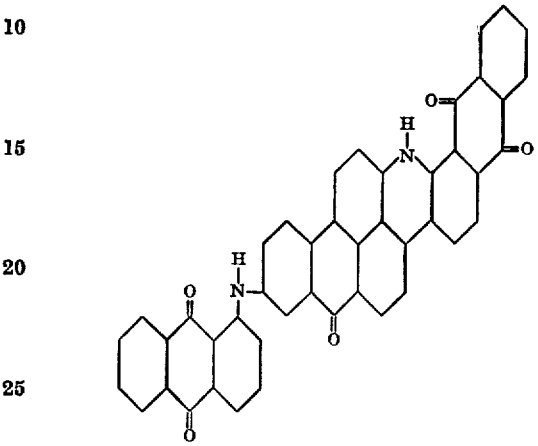

with an alkaline condensing agent with a melt comprising (A) anhydrous aluminum chloride, (B) a member selected from the group consisting of sulfur dioxide and an inorganic salt of sulfurous acid, (C) a substance which is inert to the reaction and which lowers the melting point, and (D) an alkyl halide.

5. A vat dyestuff obtained by the process according to claim 1.

6. A vat dyestuff obtained by the process according to claim 2.

7. A vat dyestuff obtained by the process according to claim 3.

8. A vat dyestuff obtained by the process according to claim 4.

References Cited in the file of this patent

FOREIGN PATENTS 297,670 Switzerland _____ June 1, 1954

UNITED STATES PATENT OFFICE

CERTIFICATE OF CORRECTION

Patent No. 2,791,587 May 7, 1957

Armin Caliezi et al.

It is hereby certified that error appears in the above numbered patent requiring correction and that the said Letters Patent should read as corrected below.

In the heading to the printed specification, line 10 thereof, foreign filing date, for "September 13, 1954" read -- September 3, 1954 --; in the printed specification, column 1, line 29, for "liphatic" read -- aliphatic --; line 30, strike out "a"; column 4, line 28, strike out "with an alkaline condensing agent".

Signed and sealed this 9th day of July 1957.

(SEAL)
Attest:

KARL H. AXLINE
Attesting Officer

ROBERT C. WATSON
Commissioner of Patents